United States Patent Office 2,739,154
Patented Mar. 20, 1956

2,739,154
PROCESS FOR THE PRODUCTION OF ISOINDOLENINE DERIVATIVES

Georg Rösch, Walther Wolf, and Heinrich Vollmann, Leverkusen, Germany, assignors to Farbenfabriken Bayer Aktiengesellschaft, Leverkusen, Germany, a manufacturing and trading organization of Germany No Drawing. Application September 4, 1952,
Serial No. 307,905

Claims priority, application Great Britain August 25, 1949

10 Claims. (Cl. 260—319)

This application is a continuation-in-part of our co-pending application Serial No. 180,696, filed August 21, 1950, entitled "New Intermediate Products."

The present invention relates to new intermediate products and to processes for their production, in particular it relates to new phthalocyanine intermediates.

It is an object of the invention to provide new intermediate products which may be used for the production of phthalocyanines.

A further object of the invention is to provide new intermediate products which may be used for the production of phthalocyanines under gentle conditions, especially at lower temperatures.

A further object of the invention is to provide very reactive new intermediate products which may be utilized in the organic synthesis.

A still further object of the invention is to provide new methods for the production of said new intermediate products.

Another object of the invention is to provide processes for the production of said intermediates on a technical scale.

Additional objects and features of this invention will become apparent as the following description proceeds. According to the prior art processes phthalocyanines have been produced by most various methods from most various starting materials. Important starting materials according to prior processes are, for instance, phthalic acid and phthalonitrile which are converted by the so-called "urea-process" or by the so-called "dinitrile-process" into phthalocyanines.

It is supposed that the formation of phthalocyanines in the hitherto used processes passes various intermediates. However, extensive experiments carried out for determining the reaction mechanism have failed to prove the presumed intermediates or to isolate them except mono-imino-phthalimide

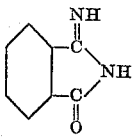

obtainable according to British specification No. 520,415, for instance, by heating phthalimide with urea and ammonium molybdate.

According to theoretical considerations Haddock (Journal of the Society of Dyers and Colourists 61 (1945), page 71) thinks it possible that in the phthalocyanine synthesis an intermediate could be formed which contains 3 nitrogen atoms in one aromatic radical in a combined state and formulated this hypothetical intermediate as follows:

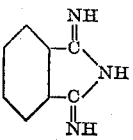

Haddock expressly declares, however, that this intermediate or any other intermediates of the phthalocyanine synthesis except the afore-mentioned mono-imino-phthalimide could neither be isolated nor determined.

(A) It has now been found that such hitherto unknown intermediate products of the phthalocyanine synthesis are obtained by heating o-arylene dicarboxylic acids, their nuclear substitution products or functional derivatives thereof in the presence of substances giving off ammonia under the reaction conditions, for instance urea, as well as in the presence of preferably at least equimolar amounts of anions which are stable under the reaction temperatures, whereby preferably nitrate ions are used and in case functional derivatives of o-arylene dicarboxylic acids containing carbonyl groups or these acids are used as reactants, in the presence of catalysts promoting formation of phthalocyanine from o-arylene dicarboxylic acids and, if desired, in the presence of inert solvents, to temperatures of about 200° C.

The intermediate products obtained according to the present invention are believed to be derivatives of isoindolenine.

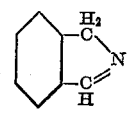

Their constitution is as follows:

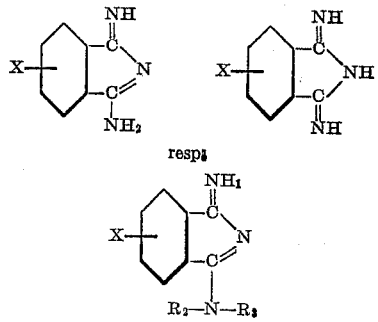

wherein X stands for hydrogen or for zero to four organic or inorganic radicals, for instance for alkyl radicals such as $CH_3$, $C_2H_5$, $C_4H_9$, $C_5H_{11}$ etc., alkoxy radicals such as $CH_3O-$, $C_2H_5O-$ etc., aroxy, alkyl mercapto and aryl mercapto radicals, heterocyclic radicals, further for halogen, —NH acyl, —$NO_2$, —COOH, —$SO_3H$, —$SO_2NH_2$, —$SO_2NH$ alkyl, —$SO_2N$(alkyl)$_2$ groups etc. X may also stand for one or two cyclic groups condensed to the benzene nucleus of the isoindolenine. One or more of the carbon atoms of the carbocyclic nucleus or carbocyclic nuclei may be replaced by hetero atoms, for instance by one or two N- or S-atoms. $R_1$, $R_2$ and $R_3$ may stand for hydrogen or also for organic or inorganic radicals, for instance for alkyl radicals such as $CH_3$, $C_2H_5$, $C_4H_9$, $C_8H_{17}$, $C_{14}H_{29}$ etc. These alkyl radicals may be substituted, for instance by hydroxy groups etc., for cycloalkyl-, aralkyl- and for aryl radicals such as phenyl, substituted phenyl radicals, naphthalene or anthraquinone radicals, for other polycyclic radicals, for heterocyclic radicals and for acyl radicals, such as formyl, acetyl, benzoyl etc. Furthermore, $R_2$ or $R_3$ may stand for —$SO_2$ aryl groups. $R_2+R_3$ may also stand for an alkylene radical which may contain hetero atoms in its chain, for example the divalent radicals —$(CH_2)_5$— and

—$(CH_2)_2O(CH_2)_2$—

(both free valences being attached to the nitrogen atom). The radicals $R_1$ and $R_2$ ($R_3$ respectively) may form a cycloalkylene ring, for instance $R_1+R_2$ may be —$(CH_2)_5$—.

As starting materials for the process according to the present invention besides phthalic acid and the functional derivatives thereof any of their nuclear substitution products containing the above mentioned radical X may be used. As polynuclear and heterocyclic o-dicarboxylic acids may be mentioned naphthalene-o-dicarboxylic acids, anthracene-o-dicarboxylic acids, pyridine-o-dicarboxylic acids, quinoline-o-dicarboxylic acids etc.

Of course, instead of the afore-mentioned dicarboxylic acids their functional derivatives may be used, such as, for instance, anhydrides, ammonium salts, imides, monoimino-imides, mono- and diamides including ureides, o-cyanocarboxylic acids, whereby the carboxylic acid group may be present in form of said functional derivatives, and o-dinitriles. It is to be understood that the o-dicarboxylic acids, their nuclear substitution products or the functional derivatives thereof which are known as starting materials in the production of phthalocyanines according to the prior art processes may also be used as starting materials for the production of the amino-imino-isoindolenines according to the present invention.

When using dicarboxylic acids or their functional derivatives containing carbonyl groups as starting materials it is necessary to add a catalyst for carrying out the reaction. The same catalysts may find application which may be used in the production of metal phthalocyanines by the conventional methods, for instance, from phthalic anhydride, according to the so-called urea process. Especially suitable catalysts are molybdic acid or its salts, for instance, ammonium molybdate. On starting from o-arylene dinitrile the addition of a catalyst may be dispensed with.

The term "substances giving off ammonia" means the compounds which may be employed on carrying out the phthalocyanine synthesis according to the urea process. Such products are, for instance, urea, guanyl urea or biuret which are used in excess.

For accomplishing the reaction according to the present invention it is further necessary to add such anions to the reaction mixture as are stable under the reaction conditions applied. These are in the first line anions of inorganic acids, such as, for instance, of nitric acid, phosphoric acid, sulfuric acid, hydrochloric acid, however, good results can also be attained by means of anions of organic acids, such as, for instance, of aliphatic and aromatic sulfonic acids as well as of methane sulfonic acid, methionic acid, toluene sulfonic acid, and of naphthalene-mono- and polysulfonic acids, for instance, naphthalene-1.5-disulfonic acid. These anions are to be used in at least equimolar quantities referred to the dicarboxylic acids or their functional derivatives. If minor quantities are employed the yield is generally reduced. Of course, larger quantities than the equimolar ones may also be used without the yield being impaired thereby.

When using o-arylene dicarboxylic acids or their functional derivatives containing carbonyl groups as reactants it is of advantage to use nitrate ions which yield with the corresponding 1-amino-3-imino-isoindolenines insoluble, salt-like compounds which are less affected by changes of temperature. However, on using o-dinitriles as starting material other anions yield equally good results. The said anions are advantageously charged in form of their ammonium salts or also as free acids which may be linked to the urea whereby it is of no consequence whether the anions are added to the reaction mixture already before or after the beginning of the reaction. In the production of the new intermediate products according to the present invention it is immaterial whether the components are simply melted or whether a solvent is added. In the first case, the substance giving off ammonia which is preferably used in excess acts as diluent. In the second case, as solvents preferably higher boiling hydrocarbons or their substitution products, such as, for instance, solvent naphtha, nitrobenzene, di- or trichloro-benzene, chloro-naphthalene are suitable, but also pyridine or quinoline may be used.

The reaction is generally initiated at temperatures of or above about 140° C., i. e. temperatures whereat the starting material generally begins to melt. The reaction temperature may be raised to the temperature usually applied in the production of phthalocyanine according to the above described process whereby reaction is completed within a short period of time without phthalocyanines being formed thereby. Otherwise, the same conditions are applied which are customary in the production of phthalocyanines according to the above-said urea process.

Methods to be applied for isolation of the amino-imino-isoindolenines or their salts obtained according to this process differ somewhat depending upon whether the reaction has been performed with or without diluents. On working without diluents the melt is taken up with organic solvents, for instance, acetone, alcohols, water or in mixtures thereof, and is further diluted with water. The salts of the amino-imini-isoindolenines already precipitate if anions yielding difficultly soluble salts, such as nitrate- or aryl sulfonic acid anions were used for accomplishing the reaction. If, however, such anions were used as give easily soluble salts of the amino-imino-isoindolenines, the amino-imino-isoindolenines are preferably precipitated by addition of nitrate ions in form of their salts or by addition of concentrated aqueous salt solutions, such as ammonium chloride-, sodium chloride-, or ammonium phosphate solutions.

When the reaction has been accomplished in the presence of solvents isolation may be effected by simply separating the amino-imino-isoindolenines from the solvents wherein the amino-imino-isoindolenines in form of their salts are insoluble. They may further be purified by means of solvents.

This process is described and claimed in our co-pending application Serial No. 180,696 of even date, entitled "New Intermediate Products."

(B) The new intermediate products may also be obtained by adding ammonia or its derivatives to o-arylene dinitriles or the functional derivatives of o-arylene-dicarboxylic acids being free from carbonyl groups which may contain hetero atoms in the aromatic ring or to the nuclear substitution products thereof, if desired, in the presence of solvents and/or catalysts and/or under pressure.

Suitable starting materials for this reaction are besides phthalonitrile any of its nuclear substitution products containing the radical X—indicated in the above formula—may be used. As polycyclic and heterocyclic o-dinitriles may be named: naphthalene-o-dinitriles, o-dicyano pyridines, 2.3-dicyano pyrazine etc. Compounds containing four cyano groups are also suitable such as 1.2.4.5-tetra-cyano-benzene and 3.4.3'.4'-tetracyano-diphenyl.

It is to be understood that all dinitriles or functional derivatives of o-dicarboxylic acids being free from carbonyl groups which are known as starting materials in the production of phthalocyanines may also be used for producing the new intermediates according to the present invention.

According to this process suitable derivatives of ammonia are for instance: primary and secondary amines such as methyl amine, dimethyl amine, ethyl amine, butyl amine, dodecyl amine, cyclohexyl amine, benzyl amine, aniline, amino diphenyl, naphthyl amines, amino anthraquinones etc., substituted amines such as alkanolamines, substituted anilines and substituted naphthyl amines. Furthermore, sulfonamides such as p-toluene sulfonamide, heterocyclic nitrogen compounds such as piperidine and morpholine, and $N^1,N^1$-substituted hydrazines such as N-amino-piperidine, $N^1,N^1$-diphenyl hydrazine may be used in the above mentioned reaction. Generally, the derivatives of ammonia are suited which are stable under the reaction conditions. The addition of ammonia or of said derivatives thereof to the aforementioned functional derivatives of o-arylene dicarboxylic acids being free from carbonyl groups, i. e. principally to the o-dinitriles, can be effected in various manners. The temperatures applied in this reaction rarely exceed to 160° or 170° C. Thus, for instance, the said reactants may be treated with ammonia or its derivatives without any additions and in the absence of solvents at temperatures above 100° C., preferably in the autoclave, under a pressure of up to about 120 to about 150 kg./cm.$^2$. After completion of the reaction the excess of ammonia or derivatives thereof respectively is removed. The reaction product thus obtained is amino-imino-isoindolenine in technically pure form which may directly be used or previously further purified by treating with water or organic solvents. In order to facilitate purification it may be of advantage to carry out the reaction in the presence of inert organic solvents, for instance, of a low alcohol. Especially useful are alcohols containing at least one —CH$_2$OH group. On using a higher boiling solvent, for instance, polyvalent alcohols, it is not necessary to carry out the reaction in the autoclave, but it is sufficient to dissolve the starting materials in the autoclave and to pass ammonia or derivatives thereof in the gaseous state over or through the solution heated to temperatures from about 100° to about 160° C. If the ammonia derivative to be added has a sufficiently high boiling point, for instance, monoethanolamine, it is sufficient to dissolve the starting material in this ammonia derivative and to heat, for instance, to temperatures between 70° and 140° C. In this way, the reaction proceeds practically quantitatively without further additions being required.

The reaction may also be performed in the presence of anions which are stable under the reaction temperatures applied. The anions may be charged, for instance, in form of their ammonium or urea salts, such as ammonium nitrate, ammonium chloride, ammonium phosphate and urea nitrate. In this case it is possible to carry out the reaction in the presence of urea or ammonia. When processing in this manner the corresponding salt of the 1-amino-3-imino-isoindolenine is produced which may be purified as described in the foregoing.

If a catalyst is added, the reaction may also be accomplished at lower temperatures. Suitable catalysts are heavy metal compounds, especially those which may be used for the production of phthalocyanines. As examples may be mentioned copper salts, especially salts of bivalent copper and salts of cobalt, nickel, iron, cadmium, zinc, or also activated metals, for instance, Raney-nickel. Also in this case, it is of advantage to carry out the reaction in the presence of a solvent and, especially, in the presence of mono- or polyvalent alcohols, especially primary alcohols. The said catalysts are added to the solution of the starting material in quantities of about 0.1–50% calculated on the starting material used and the solution is saturated with ammonia or its gaseous derivatives mentioned above or a stream thereof is passed over the solution. When using liquid or solid derivatives of ammonia these may be introduced into the solution. In this case, the addition of special solvents may be dispensed with as, for instance, in the case of monoethanolamine. The reaction mostly proceeds already at room temperature. The reaction results in the formation of the free base which mostly crystallizes from the solvent and may be separated in known manner. However, the base may also be isolated in form of its salts, for instance, by addition of nitrate ions, or in form of its carbonate by introducing carbon dioxide.

Besides the said heavy metal compounds also metal alcoholates or substances or mixtures acting like alcoholates or also alkali metal amides promote the addition of ammonia or the said derivatives thereof to the said functional derivatives of the o-arylene dicarboxylic acids being free from carbonyl groups. However, on using these products care has to be taken that the reaction temperatures are kept so low as to prevent the formation of phthalocyanine at all or, at least, to a material extent, i. e. temperatures up to about 100° C. are to be applied. Suitable metal alcoholates are those of alkali metals, alkaline-earth metals and aluminium whereby the alcohol component may consist of monovalent alcohols of any chain length desired or also of polyvalent alcohols, such as glycols, glycerol. It is not absolutely necessary to charge ready-made metal alcoholates but processing may also be performed under conditions effecting the formation of alcoholates during reaction, for instance, when using alcohols together with the said metals or when using alkali metal amides together with an alcohol. However, the same effect is also attained by charging the said metal amides together with liquid ammonia or acid amides, such as formamide, acetamide. Mixtures of alkali metal or earth alkali metal alcoholates and formamide may also be used. The amount of alcoholates or amides respectively required for accomplishing the reaction may vary in a wide range. Thus, for instance, it is possible to obtain good yields with 1 per cent or less of alcoholate calculated on the functional derivative of the o-arylene dicarboxylic acid being free from carbonyl groups. Similar yields are attained on using quantities corresponding to 1 mol of alcoholate per 1 mol of the afore-mentioned derivative or quantities exceeding said proportion.

Suitable solvents are in the first line the lower mono- or polyvalent alcohols, such as, for instance, methyl-, ethyl-, propyl-, butyl-, or amyl-alcohol or glycol or, as already mentioned above, acid amides or liquid ammonia. The said solvents may also be used together with indifferent solvents miscible therewith. As examples may be mentioned aromatic hydrocarbons such as benzene and toluene, furthermore tetrahydrofuran or diethyl glycol.

On using the last-mentioned catalysts the optimum reaction temperatures vary in a wide range and depend on the character of the metal-alcoholate or -amide and of the solvents or solvent mixtures used. On processing with liquid ammonia the boiling temperature of ammonia is generally sufficient to accomplish the reaction whereas in other cases the optimum reaction temperature is at about 40° to 65° C. However, it may be sometimes of advantage to process at temperatures up to or above 100° C. Care has to be taken that the upper limit of the reaction temperature is not exceeded since in this case the formation of phthalocyanine takes place. In spite of this fact, it is possible in some cases to operate within this critical temperature range if the reaction is performed within a very short time so that only 1-amino-3-imino-isoindolenines are principally formed, i. e. if reaction is stopped before formation of phthalocyanine starts or directly after starting of the dyestuff formation.

On using the said catalysts it is also possible to charge, besides the said arylene o-dinitriles, the corresponding hydrogenated dinitriles, for instance Δ-4.5-4-methyl-tetrahydro-phthalonitrile. The corresponding hydrogenated 1-amino-3-imino-isoindolenines are thus obtained.

This process is described and claimed in our copending application Serial No. 307,903 of even date, entitled "Process for the Production of Isoindolenine Derivatives."

(C) When using the last-mentioned catalysts the process may be carried out by reacting o-arylene dinitriles with the alcoholates in the absence of ammonia or amines to form the corresponding 1-alkoxy derivatives of the 3-imino-isoindolenine which are described in the co-pending application Serial No. 180,695 of even date relating to "Process of Dyeing and Printing" and reacting the 1-alkoxy-3-imino-isoindolenines thus obtained which may be monomeric as well as condensed ones depending on the reaction conditions applied, after isolation or also in the reaction mixture with ammonia or the aforesaid derivatives of ammonia (see part B). The monomeric or condensed alkoxy derivatives may carry nuclear substituents which are described in the above formula (see part A) under X. They may also contain hetero atoms in the carbocyclic ring and aromatic rings condensed to the benzene nucleus. If ammonia or its gaseous derivatives are used for this reaction, the same are preferably passed through the solution of the alkoxy compounds in an inert organic solvent, such as, for instance, benzene, acetone or in alcohol, or the ammonia or the derivatives thereof are dissolved in alcohol and added to the solution of the alkoxy compounds. However, salts of ammonia or derivatives thereof may also be used which are reacted with the alkoxy compounds in form of their solutions. For accelerating the reaction it may be sometimes of advantage to process in the presence of some water in the reaction solution.

If monomeric alkoxy compounds are used for carrying out the reaction the monomeric amino-imino-isoindolenines are obtained. If, however, condensed alkoxy-imino-isoindolenines are employed as reactants, condensed amino-imino-isoindolenines may be obtained, if the reaction is accomplished within a short time. Condensed amino-imino-isoindolenines comprise compounds wherein one carbon atom each belonging to the heterocyclic nucleus of two molecules of the isoindolenine are connected by a nitrogen bridge and which may contain alcohol as an addition. They correspond to the formula

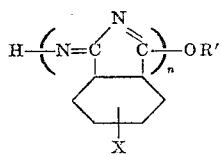

wherein X is defined as in the above formula of part A, R' being $CH_3$, $C_2H_5$, $C_3H_7$, $C_4H_9$ or $C_5H_{11}$ and other alkyl radicals and $n$ being an integer from 1 to 6. The condensed products (wherein "$n$" is greater than 1) are distinguishable over the monomers in that they yield a blue leuco compound in aqueous methanol on addition of dilute sodium hydroxide solution and sodium hydrosulfite. If the ammonia or the amines are reacted for a prolonged time and/or at higher temperatures, for instance up to about 160° C., the nitrogen bridge is split off and a further molecule of ammonia is added so that, for instance, in the case of the dimeric product two molecules of monomeric amino-imino-isoindolenine are formed.

When using primary amines as derivative for carrying out the above reaction, also the imino group of alkoxy-imino-isoindolenine may be replaced by these primary amines.

Isolation of the amino-imino-isobindolenines thus obtained from the reaction solutions as far as they are crystallized may be accomplished in known manner by simply separating out. The non-crystallized portions may be isolated either after concentrating the solution, preferably in vacuo, or by adding the aforesaid anions forming difficultly soluble salts.

Besides the said alkoxy-imino-isoindolenines also the corresponding thio-compounds may be used for carrying out the reaction with ammonia or its above mentioned derivatives. Thus, for instance, according to Porter, Robinson and Wyler (Journal of the Chemical Society, London, 1941, page 630) a mercapto compound is obtained which is indicated as o-cyano-thiobenzamide by addition of sodium sulfhydrate to phthalonitrile. The same compound may also be produced by reaction of anhydrous sodium sulfide upon phthalonitrile in methanol. The products prepared according to these two processes are believed to be 1-mercapto-3-imino-isoindolenines. The corresponding amino-imino-isoindolenines are obtained by reacting the said mercapto compounds or the alkyl ethers thereof with ammonium nitrate in the presence of a solvent or suspending agent and isolating the nitrates of the amino-imino-isoindolenine thus formed.

Instead of using the said alkoxy-imino-isoindolenines it is also possible to charge alcohol-hydrochloric-addition products obtained from aromatic o-dinitriles according to Pinner ("Die Imidoäther and ihre Derivate," Berlin, 1892, page 2 etc.) which are almost identical with the above-mentioned alkoxy-imino-isoindolenines except that they contain hydrogen chloride in the molecule. Hence it follows that in the reaction of the products obtained according to Pinner with ammonia or its derivatives which is preferably carried out in alcohol, care has to be taken that processing is done at very low temperatures, for instance, at 0° C. in order to avoid saponification by the hydrochloric acid present.

(D) In the production of the N-substituted derivatives of amino-imino-isoindolenines or its derivatives substituted in the carbocyclic ring as it is described in part A it is not absolutely necessary to start from dinitriles or the above-mentioned reactants, but these starting materials may also be reacted with ammonia to form amino-imino-isoindolenine which is not substituted at the nitrogen and the products thus obtained or their salts respectively may be reacted subsequently with the above mentioned derivatives of ammonia, for instance primary or secondary aliphatic, aromatic, cycloaliphatic, polycyclic and heterocyclic amines, which may be substituted such as alkanolamines, the derivatives of aniline or naphthalamines etc., $N^1.N^1$-substituted hydrazines, furthermore piperidine, morpholine and hydroxylamine. This exchange reaction generally proceeds smoothly with splitting off ammonia. The reaction is most easily performed with primary amines whereby the reaction velocity is often satisfactory at room temperature. It is often of advantage to carry out the reaction in an inert organic solvent. Suitable solvents are in the first line alcohols, especialy methanol or also water or formamide. When the reaction is accomplished by means of liquid amines, such as, for instance, ethanol amine, anisidine, an excess of these products may act as solvent. In the case of primary amines either the amino group alone or also the amino group and the imino group may be substituted. The weakly basic aromatic amines, for instance, aniline substitute the amino group only when the reaction is performed under gentle conditions. The imino group is substituted at higher temperatures and when the reaction is performed within a prolonged period of time. Mostly the reaction is accomplished at temperatures up to about 160° and 170° C.

On using strong basic, primary, aliphatic amines the exchange of the imino group is so easily effected that generally derivatives substituted at both nitrogen atoms can be isolated. On using secondary amines derivatives are obtained which are substituted at one nitrogen only. It is often possible to exchange the substituted amino or imino group vice versa by treatment with ammonia in excess against a non-substituted amino or imino group. It is further possible to replace a substituted amino or imino group by amino groups substituted by a different radical. Also N-substitution products which contain different substituents on the amino and imino groups may be obtained. By using aliphatic diamines such as polymethylene diamines products may be obtained in which both N-atoms of the amino and imino group are linked by a methylene bridge.

Isolation of the 1-amino-3-imino-isoindolenines thus obtained may be accomplished in usual manner, for instance, by simply separating out the portions crystallizing out of the reaction solution. In other cases they may be precipitated and separated by adding solvents reducing their solubility and being miscible with the originally used solvent, for instance, hydrocarbons or ice water. However, anions may be added which yield difficultly soluble salts, for instance, nitrate ions. Finally, the 1-amino-3-imino-isoindolenines may also be obtained by distilling off the solvent used in the reaction.

This process is described and claimed in our co-pending application Serial No. 307,904 of even date, entitled "Process for the Production of Isoindolenine Derivatives."

The amino-imino-isoindolenines obtained according to the above described processes represent new products. They are generally colorless to yellow colored and mostly readily crystallize. They are stable and fast to storing in their crystalline form. Their melting points are generally above 100° C. On melting, in most cases, splitting off of ammonia or the derivatives thereof and decomposition take place, colored melts being left thereby.

The amino-imino-isoindolenines partly dissolve in water and in alcohols to form the corresponding hydrates or dihydro-alkoxy-derivatives, i. e. they absorb one mol of water or of alcohol. Furthermore, they are soluble in dilute and in concentrated acid from which they may be recovered in form of their salts. These salts are more or less soluble in water, such as, for instance, the formates, acetates and chlorides; difficultly soluble are, for instance, the nitrates, sulfites, phosphates, oxalates and the aryl sulfonic acid salts. The salts of amino-imino-isoindolenines wherein nitrogen is substituted often behave differently as to their solubility from the unsubstituted ones. The salts when heated are also soluble in a number of organic solvents, such as in substituted aromatic hydrocarbons, such as nitrobenzene, chlorobenzene and acid amides, furthermore in tertiary bases, for instance, pyridine. Also in this case, decomposition, i. e. splitting off of ammonia or derivatives thereof mostly takes place. The salts are generally difficultly soluble in aliphatic and aromatic hydrocarbons as well as in ketones, ethers etc. With dilute alkali lyes the hydrates or the free base respectively form alkali metal salts being easily soluble in water.

The 1-amino-3-imino-isoindolenines are gradually saponified in aqueous solutions, the corresponding mono-imino-arylene-dicarboxylic-acid-amides being formed thereby. Decomposition is promoted by heating or adding dilute acids or alkali lyes.

The salts of 1-amino-3-imino-isoindolenines generally contain one acid residue per one mol of isoindolenine—however, salts have been isolated containing less, for instance, ½ or ⅓ equivalent of the acid per 1 mol of isoindolenine—which is mostly present in a combined state, for instance, in the case of nitrate. The salts may also be recrystallized from aqueous ammonia solutions under certain conditions. On the other hand, in any case, the free base or its hydrate respectively is obtained by adding equivalent amounts of alkali lye to the salts.

The 1-amino-3-imino-isoindolenines, as far as their amino group is not substituted, are accessible to many reactions of the primary amines. For instance, they may be acylated or alkylated. With diazonium compounds they yield diazo-amino compounds. They can easily be reacted with aldehydes. Aromatic o-dinitriles may be added in the presence of alkali metal alcoholates to form higher molecular products mostly containing alkoxy groups in the molecule. The 1-amino-3-imino-isoindolenines are converted with phenyl hydrazine into intensely colored compounds. On heating the 1-amino-3-imino-isoindolenines in high boiling solvents for a longer time ammonia or, if N-substituted compounds have been used, the derivatives thereof are split off and condensation products are obtained which contain i. e. tricyano cyaphenine. On heating the 1-amino-3-imino-isoindolenines in pyridine-water-mixtures in the presence of sodium hydrosulfite generally blue colored solutions are obtained which by the action of excess sodium hydrosulfite or atmospheric oxygen easily decolorize again.

On heating solutions of amino-imino-isoindolenines with reducing agents, for instance, with formaldehyde or if reducing agents are used as a solvent, for instance, formamide, more or less large quantities of metal-free phthalocyanines are obtained. On heating them together with metal salts and reducing agents the corresponding metal phthalocyanines are formed.

The monomeric as well as the condensed aromatic 1-amino-3-imino-isoindolenines may be reacted with heavy metals forming complexes, if necessary, in the presence of solvents to form crystallizable complexes.

The 1-amino-3-imino-isoindolenines according to the present invention may be substituted as already mentioned above in the carbocyclic ring by one or more radicals. The compounds may also carry condensed aromatic or heterocyclic nuclei.

Besides the nuclear substituents the compounds may carry at the nitrogen of the imino and amino group the most various organic substituents.

The new 1-amino-3-imino-isoindolenines—as far as they contain in the amino group an active hydrogen atom in a combined state—may be present in their tautomeric forms, i. e. a hydrogen atom is attached to the nitrogen bridge; in this case the 1-amino-3-imino-isoindolenines show the constitution of the corresponding diimino-imides. In some cases, however, other tautomeric forms may also be present.

The invention is further illustrated by the following examples without being restricted thereto, the parts being by weight.

*Example 1*

70 parts by weight of 2'.5'-dimethoxy-diphenyl-3.4-dicarboxylic acid anhydride, 25 parts by weight of ammonium nitrate, 0.2 part by weight of ammonium molybdate are introduced in portions into a melt of 75 parts by weight of urea while stirring at 140° C. The temperature is slowly raised to 170° C. After 1–2 hours a yellow precipitate forms in the orange colored solution. The stiffening melt is diluted by addition of urea so as to remain capable of being stirred. After 6 hours 500 parts by volume of cold water are added to the melt which is cooled to 100° C., the yellow precipitate of the resulting nitrate of 1-amino-3-imino-5-(or 6-)-(2'.5'-dimethoxy-phenyl)-isoindolenine is suction filtered, washed with cold water and dried. The yield amounts to 70 parts by weight.

The base is prepared by mixing with stirring 70 parts by weight of the nitrate and 140 parts by weight of methanol, adding a solution of 4.8 parts by weight of sodium in 100 parts by volume of methanol, separating the sodium nitrate by filtration and distilling off the methanol in vacuo. The base remains behind as a yellow crystalline mass in a quantitative yield.

*Example 2*

128 parts of phthalonitrile are melted with 240 parts of urea and 80 parts of ammonium nitrate and stirred for 20 hours at 150–160° C. The cooled melt is made into a paste with water whereby any acid, preferably nitric acid, may be added until the reaction has become neutral or weakly alkaline. The nitrate of amino-imino-isoindolenine formed which is practically insoluble in cold water is sucked off and washed with water. The product is obtained in excellent yield and purity.

*Example 3*

128 parts of phthalonitrile, 300 parts of urea and 132 parts of diammonium phosphate are heated with stirring for several hours at about 150° C. A clear melt is formed which is extracted after cooling with water or dilute ammonium phosphate solution. The amino-imino-isoindolenine phosphate is separated from the filtrate by adding ammonium phosphate and the reaction product is purified by dissolving and reprecipitating with acetone-water-mixtures.

*Example 4*

25 parts of 4-phenoxyphthalic acid are introduced at 110° C. into a melt of 12 parts of urea, 14.4 parts of ammonium nitrate and 0.3 part of ammonium molybdate and stirred for one hour at 175–180° C. until the initially formed long, thin prisms have been converted into short, coarse crystals whereby a mixture of 12 parts of urea and 12.4 parts of ammonium nitrate is still gradually added. The cooled melt is diluted with methanol and water, the precipitated nitrate of 5- or 6-phenoxy-1-amino-3-imino-isoindolenine respectively is sucked off and washed with methanol and water. If any mono-imino-phthalimide is present in the nitrate it is removed by boiling off with acetone.

The free base is obtained from the nitrate by introducing same into a solution of sodium methylate in acetone, the base dissolving thereby. The base is precipitated from the solution by adding water.

The 5-(or 6-)phenoxy-1-amino-3-imino-isoindolenine melts at 99° C. and is very easily soluble in methanol and, contrary to most amino-imino-isoindolenines, also soluble in acetone. The product dissolves in dilute acetic with weakly yellow coloration. By adding ammonium nitrate and acetic acid the product is precipitated from its solution in acetone in the form of its difficultly soluble nitrate in colorless, clustered needles.

Example 5

11.6 parts of 4.5-diphenyl-phthalic anhydride are introduced at 110° C. into a melt of 5 parts of urea, 6 parts of ammonium nitrate and 0.1 part of ammonium molybdate and heated for one hour each at 140° C. and 155–160° C. and for further 14–15 hours at 175–180° C. until the initially formed long, thin needles have been converted into small, coarse crystals. The melt somewhat cooled on standing is diluted with methanol, the nitrate of 5.6-diphenyl-1-amino-3-imino-isoindolenine is sucked off and washed with methanol and acetone. The best method of isolating the free base consists in treating the nitrate with a solution of sodium methylate in dioxane.

Example 6

60 parts of urea, 55 parts of 3-chlorophthalic anhydride, 48 parts of ammonium nitrate and 0.5 part of ammonium molybdate are heated and worked up according to the method described in Example 14, complete specification, British Patent No. 698,049, 41 parts of the nitrate of 4- or 7-chloro-1-amino-3-imino-isoindolenine respectively are thus obtained.

Example 7

A mixture of 56 parts of 4-phenylphthalimide, 60 parts of urea, 40 parts of ammonium nitrate and 0.3 part of ammonium molybdate is heated with stirring to 170° C. until the melt has become crumbly. Heating is then continued at the same temperature without stirring. After heating for totally 20 hours the cold melt is stirred with methanol, sucked off, the reaction product is washed with methanol and dried. 65 parts of the technically pure nitrate of 1-amino-3-imino-5-phenylisoindolenine or of 1-amino-3-imino-6-phenylisoindolenine are thus obtained.

Example 8

128 parts of phthalonitrile, 300 parts of urea and 125 parts of urea nitrate are stirred for several hours at about 150° C.

Further processing and isolation of the reaction product is performed as described in Example 2.

Example 9

204 parts of 3.4-dicyano diphenyl are added to a melt consisting of 480 parts of urea and 80 parts of ammonium nitrate and stirred for 30 hours at 150–160° C.

The cooled melt is ground with a solution of ammonium nitrate in water and acetic acid is added until the reaction has become neutral or weakly acid. The mixture is then sucked off and the product is washed with water. The phenylamino-imino-isoindolenine is obtained in a very pure state and excellent yield.

Example 10

128 parts of phthalonitrile, 300 parts of urea and 100 parts of p-toluene sulfonamide are melted and heated for several hours to 150–160° C. with stirring.

The initially clear melt changes to deep yellow and finally to light green. The cooled melt is dissolved in 60% acetone, filtered and the reaction product precipitated again by diluting the solution with water. The p-toluene sulfonamido-imino-isoindolenine obtained in a good yield is purified by recrystallization from an ethanol-benzene-mixture (ratio 1:1). According to elementary analysis the following values were found:

| found | calculated for $C_{15}H_{13}O_2N_3S$ |
|---|---|
| C=60.82% | C=60.17% |
| H= 4.56% | H= 4.38% |
| O=10.71% | O=10.70% |
| N=14.40% | N=14.05% |
| S=10.35% | S=10.70% |

Example 11

32 parts of phthalonitrile are heated with 95.6 parts of liquid ammonia in a stirring autoclave of chrome-nickel-steel for 5 hours at 110–118° C. (about 80 atmospheres overpressure). After cooling the $NH_3$ is blown off and the solid, light blue-grey residue (37.6 parts) is ground several times with water previously heated to 40–50° C. and sucked off until the residue has no longer a bitter taste. For removing any slight amounts of phthalonitrile the residue is boiled off with water, about 1.5 parts of deep blue small needles of practically metal-free phthalocyanine remaining behind thereby. The aqueous extract solidifies on cooling to a viscous paste of colorless small needles of amino-imino-isoindolenine which after sucking off, cautiously washing with some water and drying, melt at 192–195° C.

Example 12

128 parts of phthalonitrile are heated to 140° C. with 80 parts of ammonium nitrate in 4000 parts of liquid ammonia while stirring for 20 hours in an autoclave.

The crude amino-imino-isoindolenine-nitrate remaining after distilling off the ammonia is purified by treatment with cold water and hot benzene.

Example 13

30 parts of phthalonitrile are dissolved at about 110° C. in 32 parts of monoethanolamine and kept at this temperature. After solidifying the reaction mixture is ground and washed with ethanol. 1-oxethylamino-3-oxethyl-imino-isoindolenine is obtained in quantitative yield. In order to prevent overheating and to facilitate isolation the reaction mixture may be diluted with a solvent, for instance, an alcohol.

Example 14

128 parts of phthalonitrile are mixed with stirring with 250 parts of glycol and the mixture is saturated with ammonia at 50° C. The dinitrile dissolves during about 24 hours whereas the glycolate of 1-amino-3-imino-isoindolenine ($C_8H_7N_3+C_2H_4O_2$) crystallizes. The glycolate is isolated by suction filtration at 0° C., washed with benzene and acetone.

When using in the above reaction starting materials containing contaminations the mixture is heated to about 80° C. towards the end of the reaction whereby the reaction product dissolves and the contaminations can easily be separated off by filtration.

The reaction may also be conducted at higher temperatures, say up to about 120° C. In this case it is preferable to dissolve the dinitrile in glycol and to add ammonia at decreasing temperatures.

The reaction proceeds in the same manner below 50° C., however, the reaction times are prolonged in the absence of catalysts such as alkali and metallic ions.

Example 15

16 parts of phthalonitrile are dissolved in 50 parts of glycol at 130–140° C. and while passing ammonia over the mixture stirred for 2–3 hours each at 120–130° C., 100–110° C., 80–90° C., 50–60° C. and finally at 0° C. with cooling.

The molecular compound of amino-imino-isoindolenine with glycol $C_8H_7N_3 \cdot C_2H_6O_2$ crystallizes in abundant quantity in analytically pure form and may be easily isolated by sucking off and washing with acetone.

Example 16

13 parts of phthalonitrile and 0.1 part of copper chloride are stirred into 100 parts of monoethanolamine.

Phthalonitrile goes into solution and 1-oxethylamino-3-oxethylimino-isoindolenine crystallizes. The product can easily be isolated in a quantitative yield by sucking off and washing with alcohol.

Example 17

50 parts of phthalonitrile and 0.5 part of copper sulfate are suspended in 250 parts of methanol and the mixture is saturated with ammonia. Phthalonitrile gradually dissolves at 20–70° C. A blue-grey, finely crystalline copper complex salt of amino-imino-isoindolenine precipitates. Moreover, 30 parts of the free base $C_8H_7N_3$ precipitate in coarse crystals. The chief portion remaining dissolved can be precipitated at nitrate by stirring the mixture into weakly acidified water containing nitrate. A quantitative total yield is obtained.

The reaction proceeds more slowly in formamide, however, may equally be performed in other alcohols, such as ethanol, glycol. Similar or better results are attained on replacing $CuSO_4$ by other copper salts, such as $CuCl$, $CuCl_2, 2H_2O$, $CuNO_3 \cdot 3H_2O$, glycocoll copper, acetyl-acetone-copper, or also salts of copper, nickel, cobalt, cadmium etc., or active metals, for instance, Raney-nickel. Depending on the conditions applied the reaction is accomplished within 2–70 hours.

Example 18

A sodium methylate solution consisting of 3 parts of sodium and 128 parts of anhydrous methanol is poured onto 128 parts of phthalonitrile.

The mixture is vigorously stirred with cooling, however, towards the end of the reaction which is accomplished within a few minutes the temperature is allowed to raise up to 50° C. or also up to the boiling point of the mixture. The color of the solution containing a mixture of condensed alkoxy-imino-isoindolenines (i. e. condensation products wherein "n," as hereinbefore defined, is 2 to 6) changes thereby from yellow to orange and finally to deep dark red brown. As soon as the phthalonitrile has completely dissolved the temperature is reduced below 50° C. and gaseous ammonia is passed over the solution with stirring. After some time 1-amino-3-imino-isoindolenine begins to precipitate as thick crystal paste. The mixture is further stirred for some hours, diluted with 128 parts of acetone, further saturated with ammonia, the temperature is lowered to 0° C., the solution is sucked off, the precipitate is washed with acetone until the washing has become colorless, and dried.

100 to 105 parts of 1-amino-3-imino-isoindolenine corresponding to 70% of the theoretical are thus obtained. The product is yellowish colored. A completely colorless product is obtained by carrying out the reaction at lower temperatures with one and a half to two times the quantity of alcohol and three to five times the quantity of sodium, the yield being somewhat impaired thereby.

The portions of the reaction product remaining dissolved after sucking off and washing may be precipitated as nitrate.

Example 19

50 parts of sodium are dissolved in 320 parts of anhydrous ethyl alcohol. The mixture which solidifies after cooling is dissolved in 1130 parts of formamide. At 50° C. 204 parts of 3.4-dicyano diphenyl are introduced with stirring until after a few hours the dinitrile has dissolved. The reaction mixture soon solidifies to a crystal paste which is cooled and kept at room temperature for several hours. The precipitated product is separated by suction, the part remaining dissolved is precipitated by adding water. The monohydrate of 1-amino-3-imino-5(or 6)-phenyl-isoindolenine is obtained in excellent purity and yield from both parts by recrystallization from a mixture of acetone and water (about 1:1).

Example 20

40 parts of calcium are dissolved in 400 parts of anhydrous methanol. 1130 parts of formamide are added at room temperature, whereupon 128 parts of phthalonitrile are introduced.

The solution is stirred for a few hours at 70–80° C. The initially yellow solution which changes to yellow green is introduced when cold into a mixture of ice, ammonium nitrate and nitric acid. The precipitate formed thereby is sucked off and washed with water. After drying the crude product is boiled out with acetone and sucked off again. The nitrate of the amino-imino-isoindolenine thus obtained is not yet quite pure. Purification may be achieved as indicated in Example 13, complete specification British Patent No. 698,049.

Reaction may also take place without the use of alcohol in such a manner that the calcium is dissolved in formamide at temperatures of about 70° C. and the phthalonitrile is introduced with stirring after cooling.

When working in this manner the possibility of dyestuff formation being initiated is much greater.

Example 21

14 parts of lithium are dissolved in 400 parts of anhydrous ethanol. 1130 parts of formamide are added at room temperature and 128 parts of phthalonitrile are introduced with stirring.

The reaction mixture is heated for some hours to 70–80° C. Further processing is done as indicated in Example 20. The nitrate of amino-imino-isoindolenine is obtained in a yield of 80% of theory. Similar conditions as indicated in Example 20 with regard to calcium may be applied in a reaction carried out without alcohol.

Example 22

46 parts of sodium are dissolved in 800 parts of anhydrous methanol and after cooling there are introduced with stirring 128 parts of phthalonitrile dissolving with slight self-heating. Into the mixture is stirred a solution of 342 parts of p-toluene sulfonamide in 800 parts of anhydrous methanol and the mixture is heated for 4 hours at about 90° C. The 1-p-toluene sulfonamino-3-imino-isoindolenine is thus formed.

By stirring the reaction mixture into an ammonium salt solution cooled with ice the reaction product precipitates. The precipitate is purified by boiling out with ethanol and with benzene. This sulfonamide compound does not form a difficultly soluble nitrate.

Example 23

128 parts of phthalonitrile are introduced into a mixture of 86–90 parts of piperidine and a sodium methylate solution consisting of 2 parts of sodium and 45–50 parts of methanol.

The phthalonitrile dissolves within a very short time. The heat being set free is discharged to such an extent that the temperature raises only to about 50° C.

The 1-piperidino-3-imino-isoindolenine precipitates in colorless needles already at the reaction temperature or after cooling. Isolation is effected by diluting the reaction mixture with 80–100 parts of acetone. The mixture is sucked off when cold and the precipitate is washed with cold acetone and benzene. The product obtained is analytically pure and shows a flash point of 120° C.

On replacing piperidine by morpholine the reaction yields 1-morpholino-3-imino-isoindolenine. The product decomposes at about 140° C. with blue coloration. It forms with ammonium nitrate 1-amino-3-imino-isoindolenine nitrate.

Example 24

46 parts of sodium are dissolved in 800 parts of anhydrous ethanol. 430 parts of piperidine are added and 204 parts of 3.4-dicyano diphenyl are dissolved in the mixture with stirring and heating.

The solution from which impurities, if any, may be removed by filtration is heated for 2–3 hours at about 90° C. and then cooled. The reaction mixture from which on longer standing small amounts of the base formed precipitate is then stirred into a mixture of ice and 200 parts of nitric acid. The nitrate of the 5-(or 6-)phenyl-1-piperidino-3-imino-isoindolenine is thus obtained in good yield. The precipitate is sucked off, washed with water and dried. The product may be recrystallized from an alcohol-benzene-mixture (about 1:1). The nitrate melts at about 215–220° C. with dark coloration.

According to elementary analysis the compound exhibits the following composition:

| found | calculated for $C_{19}H_{20}O_3N_4$ |
| --- | --- |
| C=64.05% | C=64.74% |
| H= 4.20% | H= 5.72% |
| N=15.85% | N=15.91% |
| O=14.28% | O=13.63% |

By replacing piperidine by morpholine, aniline, dimethylamine well crystallized compounds are obtained in good yields.

Example 25

46 parts of sodium are dissolved in 800 parts of ethanol. To this mixture are added after cooling 300 parts of n-butylamine and 128 parts of phthalonitrile. The mixture is heated to 90° C. with stirring. After about 4 hours' stirring the butylamino-imino-isoindolenine begins to precipitate at this temperature. The product is most easily isolated as nitrate by stirring the reaction mixture into cold dilute nitric acid. The following values for the nitrate were obtained according to elementary analysis:

| found | calculated for $C_{12}H_{16}O_3N_4$ |
| --- | --- |
| C=55.22% | C=54.51% |
| H= 6.44% | H= 6.11% |
| O=18.20% | O=18.17% |
| N=21.20% | N=21.21% |

Example 26

80 parts of pulverized sodium amide are introduced into 850 parts of formamide in portions at 0° C. while stirring and cooling with a freezing mixture of ice and sodium chloride. 128 parts of phthalonitrile are added in portions to the clear solution and the temperature is raised to 60–70° C. A yellow solution is obtained from which colorless prismatic needles precipitate.

After 6–8 hours the solution is cooled, the amino-imino-isoindolenine obtained in good yield is sucked off, washed with some formamide and acetone and dried. By introducing the filtrate into a mixture of ice and nitric acid containing as much nitric acid as is required for neutralization and salt formation, a further quantity of amino-imino-isoindolenine is obtained as nitrate.

Example 27

80 parts of pulverized sodium amide are introduced in portions at 0° C. into 1130 parts of formamide while stirring and cooling with a freezing mixture of ice and sodium chloride. 204 parts of 3.4-dicyano diphenyl are gradually added to the solution. The temperature is then slowly raised to 50° C. A yellow solution is formed from which grey crystals precipitate. After about 6 hours the solution is cooled, the hydrate of phenyl-amino-imino-isoindolenine obtained in almost quantitative yield is sucked off, washed with some formamide and acetone and dried.

Example 28

12.2 parts of sodium amide are introduced into 150 parts of formamide at 0° C. with cooling and stirring. 30 parts of 4.5-dichlorophthalonitrile are added in portions to the clear solution. After gradually raising the temperature to 40° C. and stirring at this temperature for 12 hours the mixture is cooled and sucked off, the precipitate obtained is washed with acetone and ether and dried. The yield amounts to 27 parts of 4.5-dichloro-1-amino-3-imino-isoindolenine decomposing at about 265° C. while splitting off ammonia.

Example 29

60 parts of formamide, 3.5 parts of sodium amide and 107 parts of 3.4-dicyanodiphenylsulfone are reacted as described in Example 28. 9 parts of 1-amino-3-imino-isoindoleninyl-5- or -6-phenylsulfone decomposing at about 215° C. while splitting off ammonia are thus obtained.

Example 30

32 parts of pulverized sodium amide are introduced in portions into 320 parts of formamide at 0° C. with stirring and cooling with a freezing mixture of ice and common salt. 53 parts of Δ-4.5-4-methyl-tetrahydrophthalonitrile are added in portions to the clear solution. The temperature is allowed to raise to room temperature, whereby colorless crystals more and more precipitate from the initially yellow and then violet red colored solution. After about 12 hours tetrahydrated amino-imino-methyl-isoindolenine formed is sucked off and washed with acetone and ether. The product decomposes at about 130° C. while splitting off ammonia. The new substance is converted into the corresponding tetramethyl-octahydrometal-phthalocyanine by means of metal salts, for instance, salts of copper, nickel and cobalt, in the presence of glycol or formamide, already at temperatures of about 100° C. The new phthalocyanine dissolves in concentrated sulfuric acid with blue coloration. On gently heating the blue solution changes to brown, tetramethyl-copper-phthalocyanine being formed with further dehydrogenation.

If, however, the tetrahydrogenated amino-imino-methyl-isoindolenine is heated in nitrobenzene in the presence of a copper salt for a longer time tetramethyl-copper-phthalocyanine is immediately obtained.

Example 31

15.6 parts of sodium amide are dissolved at 0° C. with cooling and stirring in 90 parts of formamid. 17.8 parts of 1.2.4.5-tetracyanobenzene (prepared from pyrromellitic acid tetraamide by conventional methods) are added in small portions to the clear solution. A deep red solution is formed from which yellow, prismatic needles soon precipitate which are sucked off after one hour's stirring at room temperature, washed with some formamide and acetone and dried. The benzodi(amino-imino-pyrrolenine) obtained in good yield decomposes on heating without melting.

Example 32

40 parts of sodium amide are dissolved at 0° C. in 300 parts of formamide with stirring. 60 parts of 3.3′.4.4′-tetracyanodiphenyl are added in portions to the clear solution and gradually heated to 40–60° C., a yellow brown solution being formed thereby. After about one hour's stirring the solution is cooled with ice. Di-(amino-imino-isoindoleninyl) precipitates in nearly quantitative yield in yellow, fine, small needles, which are sucked off, washed with some formamide and acetone and dried. Di(amino-imino-isoindoleninyl) decomposes on heating without melting.

*Example 33*

64 parts of phthalonitrile are dissolved at 10° C. in 2000 parts of anhydrous benzene and 23 parts of absolute alcohol are added. Thereupon dry hydrogen chloride is passed over the mixture at 5–10° C. for 48 hours and the crystalline precipitate is sucked off, washed with dry benzene and dried in vacuo. The yield amounts to 63 parts.

40 parts of the imino-ether thus obtained are introduced at 0° C. into a solution of 50 parts of ammonia in 400 parts of methanol and the methanol is evaporated in vacuo.

44 parts of a residue which is dissolved at 0° C. in 200 parts of about 80% nitric acid are obtained. On pouring the solution onto small pieces of ice the nitrate of 1-amino-3-imino-isoindolenine is precipitated, sucked off, washed with water and dried in air.

Replacing phthalonitrile by the equivalent quantity of 3.4-dicyanodiphenyl the nitrate of 1-amino-3-imino-5-(or -6-)phenylisoindolenine is obtained.

*Example 34*

102.4 parts of phthalonitrile are introduced at 20° C. into a solution of 4.6 parts of sodium in 81 parts of methanol diluted with 450 parts of benzene.

Stirring is continued until the phthalonitrile has been dissolved with yellow coloration.

20.4 parts of ammonia (100%) dissolved in methanol and 0.9 part of water are added to the alkoxyimino-hexane (i. e. a condensation product wherein "n," as hereinbefore defined, is equal to 6) so obtained and it is further stirred at 20° C. until a test portion gives no longer a stable, blue leuco compound in methyl alcoholic aqueous solution with dilute sodium hydroxide solution and sodium hydrosulfite. 64.4 parts of formic acid are allowed to run into the solution which is still stirred for some time; the crystalline precipitate formed is sucked off, washed with benzene and dried in vacuo. About 167.7 parts of formate corresponding to 94.5 parts of 1-amino-3-imino-isoindolenine or 85.6% of the theoretical are thus obtained.

By replacing formic acid by equivalent amounts of other carboxylic acids corresponding salts of the acids are obtained.

*Example 35*

35.6 parts of 1.2-dicyanonaphthalene are introduced into a solution of 1.15 parts of sodium in 40.4 parts of methyl alcohol diluted with 182.5 parts of benzene and stirred until the 1.2-dicyanonaphthalene has been dissolved with yellow coloration. 20.4 parts of ammonia (100%) dissolved in methanol are added to the condensed alkoxy-imino-isoindolenine so obtained and stirred until a test portion gives no blue leuco compound in methyl-alcoholic, aqueous solution. The precipitate obtained in a good yield (amounting to 70% of the theoretical) is sucked off and washed with benzene and ligroin and dried in vacuo. The crude product is obtained by concentrating its methyl-alcoholic solution in small, coarse crystals melting at 204–208° C. with green coloration.

*Analysis.*—Calculated: C=73.9%; H=4.61%; N=21.52%. Found: C=73.78%; H=4.35%; N=21.21%; O=0.77%.

The 1-amino-3-imino-4.5-benzo-isoindolenine is difficultly soluble in cold methanol, dissolves in methyl-alcoholic sodium hydroxide solution with weakly yellow coloration, however, precipitates again on adding water because of the sodium salt being hydrolized. The product is difficultly soluble in acetone and comparatively difficultly soluble in cold pyridine. It dissolves in dilute acetic acid with yellow coloration and precipitates as difficultly soluble nitrate in yellow needles by adding ammonium nitrate. It is soluble in dilute hydochloric acid with yellow coloration but precipitates again immediately as yellow hydrochloride which is converted into colorless needles on boiling.

*Example 36*

11.0 parts of 3′.4′-dicyano-(C)-phenyl-6-methyl-benzthiazol are introduced into a solution of 0.23 part of sodium in 55.4 parts of methanol diluted with 45.6 parts of benzene and stirred until the starting product has almost completely been dissolved. 4.1 parts of ammonia (100%) dissolved in methanol are added to the condensed alkoxy-imino-isoindolenine so obtained and the solution is kept at 35–40° C. until a test portion gives no longer a blue leuco compound. The crystalline precipitate is sucked off, washed with benzene and ligroin and dried in vacuo.

Amino-imino-isoindoleninyl-methylbenzthiazol is obtained in a yield of about 90% of the theoretical as greenish grey powder containing already small quantities of phthalocyanine and slightly dissolving in methanol and acetone. The product is soluble in dilute acetic acid with weakly yellow coloration and precipitates as slightly soluble, weakly yellow nitrate when adding ammonium nitrate solution. The melting point of the product containing about ½ molecule of methanol is at about 262–264° C.

*Example 37*

18.96 parts of 4-methoxyphthalonitrile are introduced at 20° C. into a solution of 0.69 part of sodium in 12.1 parts of methanol diluted in 67.5 parts of benzene and stirred until the starting product has been dissolved with yellow coloration. 12.24 parts of ammonia (100%) dissolved in methanol are added to the condensed alkoxy-imino-isoindolenine so obtained and stirring is continued until a test portion gives no stable blue leuco compound in dilute sodium hydroxide solution and sodium hydrosulfite. The solution is then concentrated to a small volume in vacuo, the crystals precipitating after some time are sucked off, washed with benzene and ligroin and dried in vacuo. 5 - (or 6 - )methoxy - 1 - amino - 3 - imino-isoindolenine is obtained in good yield in rod-shaped colorless crystals becoming green at 180° C. and decomposing at 202° C. The 5-(or 6-)methoxy-1-amino-3-imino-isoindolenine is soluble in water, soluble in methanol, difficultly soluble in acetone and gives a slightly soluble nitrate. The portions of the product remaining in the benzene mother liquor may be precipitated by adding ammonium bicarbonate.

The melting point of the carbonate extracted from the crude salt mixture with methanol and precipitated with acetone is 258–261° C.

On replacing ammonia by dimethylamine 5-(or 6-)-methoxy-1-dimethylamino-3-imino-isoindolenine is obtained in good yields.

By replacing 4-methoxy-phthalonitrile by the equivalent amount of 4-ethoxy-phthalonitrile 5-(or 6-)ethoxy-1-amino-3-imino-isoindolenine is obtained after removing a difficultly soluble by-product melting at 217–218° C. and after concentrating the benzene solution. The latter product has a melting point of 182–185° C. and exhibits similar properties as the above-said methoxy-compound.

*Example 38*

2.3 parts of sodium are dissolved in ethanol and the solution is concentrated to 18–23 parts, stirred with 52–64 parts of liquid ammonia at about −30° C. and 12.8 parts of finely ground phthalonitrile are rapidly stirred in. The starting product is almost completely dissolved while extracting ammonia by vigorously boiling and 1- ethoxy-3-imino-isoindolenine is then precipitated. The reaction product is isolated after 10 minutes by diluting the reaction mixture with 100 parts of ice+water, sucking off, washing with water and drying in vacuo at 30–40° C., in a yield of 92% of the theoretical. 16 parts of diethoxy-imino-dihydro-isoindolenine thus obtained are heated with 36.4 parts of concentrated aqueous ammonia on the water-bath. The product is dissolved within 3 minutes at 60–65° C. Traces of non-dissolved portions are removed by filtering and the solution is chilled. A thick paste of colorless, almost rectangular small crystals, which are visible by means of a microscope, is formed. The product is sucked off, washed with some water and dried. The yield amounts to 9 parts of amino-imino-isoindolenine. By adding 5 parts of ammonium nitrate to the aqueous filtrate and to the wash water further 4.7 parts of the slightly soluble nitrate precipitate.

On replacing ammonia by methylamine, dimethylamine, other mono- and dialkylamines or piperidine and morpholine the reaction yields a series of well-defined products wherein not only the alkoxy—but also the imino-group is partly exchanged against alkylamino or alkylimino radicals.

In the above reaction phthalonitrile may be replaced by 3.4-dicyano-diphenyl or 4-methoxyphthalonitrile. In this case the reaction yields the corresponding nuclear substituted 1-amino-3-imino-isoindolenine derivatives.

*Example 39*

11 parts of diethoxy-imino-dihydro-isoindolenine are heated with 36 parts of aniline on the water bath as described in Example 38. The starting product dissolves within 10 minutes at about 80° C. with deep yellow coloration and presently light yellow small crystals precipitate. After stirring at 95° C. for another 15 minutes the solution is cooled down to 20° C., sucked off, washed with methanol and dried. About 7 parts of 1-anilino-3-imino-isoindolenine forming greenish yellow, coarse small crystals melting at about 190–207° C. with decomposition and orange coloration are obtained. On acidifying the filtrate obtained as described above with dilute hydrochloric acid a slightly soluble, full, yellow colored hydrochloride precipitates. According to analysis the product obtained is a monohydrochloride of 1-phenylamino-3-phenylimino-isoindolenine.

*Example 40*

7.1 parts of 4-methylphthalonitrile are introduced at 20° C. with stirring into a solution of 0.29 part of sodium in 5.05 parts of methanol diluted with 28.1 parts of benzene and stirring is continued at 20° C. until the intensity of the yellow solution is not further increased. 1.28 parts of ammonia (100%) dissolved in methanol are added to the condensed alkoxy-imino-isoindolenine and stirring is continued until a test portion gives no longer a blue leuco compound with dilute sodium hydroxide solution and sodium hydrosulfite. The crystallized 5-(or 6-)methyl-1-amino-3-imino-isoindolenine is sucked off and washed with benzene and ligroin. The product yields colorless, full, long prisms becoming green blue at 170° C., sintering at 181–182° C. and decomposing at 189–190° C. with blue coloration.

The portions of the base remaining dissolved in the original reaction liquid may be precipitated with formic acid as formate which may be purified by dissolving in water and precipitating with acetone.

*Example 41*

80.7 parts of a methanol solution containing about 8.0 parts of anhydrous sodium sulfide are mixed with 12.8 parts of finely distributed phthalonitrile at 20° C. The temperature rises within 15 minutes to 35–40° C. while the dinitrile dissolves with deep yellow—temporarily deep green-yellow—coloration. The solution is stirred for another quarter of an hour and 20.0 parts of glacial acetic acid are gradually added drop by drop, the addition product formed thereby precipitating in crystalline form with brownish coloration. The product is sucked off and washed with methanol. The yield amounts to 13.4 parts of a product which takes on heating a very dark color and sinters at 220–225° C. with decomposition. One part of a somewhat less pure product still precipitates from the mother solution by adding water. According to its chemical behavior, mode of origin and elementary analysis the product formed is the mercapto-imino-isoindolenine or in the tautomeric form imino-thio-phthalimide. With aqueous sodium hydroxide solution an orange colored sodium salt is obtained being difficultly soluble when cold and dissolving on heating with orange coloration. The product dissolves in pyridine with red coloration and can be crystallized from this solvent. The pyridine salt first precipitating thereby decomposes on washing with methanol and shows again a light grey brown color. With dilute hydrochloric acid a reddish grey salt is obtained which temporarily dissolves on heating, however, after some time deposits in reddish grey needles, presumably consisting of thiophthalimide and phthalimide.

With methanolic sodium hydrosulfide solution—prepared by cold saturation of a solution of anhydrous Na₂S in methanol with H₂S and filtering off the precipitated sulfur—the mercapto-imino-isoindolenine described herein is obtained on heating within a short time. In this case the product deposits directly on cooling as orange colored sodium salt.

On boiling the mercapto-imino-isoindolenine in nitrobenzene for a short time blue needles with a metallic lustre of metal-free phthalocyanine precipitate, hydrogen sulfide escaping thereby.

16.2 parts of mercapto-imino-isoindolenine in 147 parts of pyridine are mixed with 12 parts of ammonium nitrate with stirring. By gently heating on the water bath the starting product dissolves within 10 minutes, an almost colorless compound precipitating from the red brown solution in a crystalline form. After stirring for half an hour at 90° C. the solution is sucked off, the precipitate is washed with pyridine until clear, washed again with water and dried. The almost colorless residue crystallizes from dilute aqueous ammonia in colorless needles and displays all properties of the amino-imino-isoindolenine-nitrate.

*Example 42*

1000 parts of acetamide and 128 parts of phthalonitrile are introduced into a solution of 150 parts of potassium hydroxide in 400 parts of technical methanol. The solution thus obtained is heated for some time at 70° C. and is stirred still hot into a mixture of 1000 parts of ammonium nitrate and ice. The precipitating amino-imino-isoindolenine-nitrate is sucked off, washed with water and dried. By boiling out with benzene and acetone the reaction product is obtained in good purity.

*Example 43*

145 parts of amino-imino-isoindolenine are stirred with 500 parts of aniline at 50–60° C., the base slowly dissolving and anilino-imino-isoindolenine or its tautomeric forms crystallizing thereby while gaseous ammonia escapes.

After 5 hours the solution is cooled with ice, sucked off, the precipitate is washed with methanol or acetone and dried. The light yellow product melting at 208° C. is obtained in analytically pure form. The yield amounts to 95% of the theoretical.

On carrying out the reaction in boiling methanol the quantity of aniline may be reduced to about 100 parts.

*Example 44*

145 parts of amino-imino-isoindolenine and 200 parts of aniline are heated with stirring.

The monosubstitution product temporarily crystallizing and redissolving on further heating is initially formed with splitting off of ammonia. The temperature is then raised to 200° C. and the solution is kept at this temperature until the splitting off of ammonia is practically complete. The initially clear melt has now become deep yellow. 1-phenylamino-3-phenylimino-isoindolenine crystallizes on cooling. Isolation is achieved by diluting the melt chilled to about 50° C. with benzene or acetone to double the volume, cooling with ice and further diluting with benzine.

The pure base is colorless, dissolves in alcohols, acetone and benzene and melts at 130° C. with yellow coloration and may be distilled at 165–168° C. under 5 mm. pressure without decomposition. The salts of the base are deep yellow colored. The product is obtained in a quantitative yield.

The addition product of 1 mol of aniline to 1 mol of phenylamino - 3 - phenylimino - isoindolenine temporarily crystallizes under the said conditions. This product melts at 78–79° C. and splits off again the added aniline at 90–100° C.

*Example 45*

20 parts of amino-imino-isoindolenine and 30 parts of o-anisidine are heated with stirring as fast as possible in view of the active splitting off of ammonia and the solution is kept at 150° C. for 15 minutes, the base charged being initially dissolved in anisidine. Presently the reaction product crystallizes already at the reaction temperature. The reaction mixture is then cooled, stirred with methanol, sucked off when ice-cold, the precipitate is washed with methanol and dried. o-Methoxy-anilino-imino-isoindolenine or its tautomers respectively are obtained in analytically pure form. The light yellow product melts at 195–200° C.

*Example 46*

20 parts of amino-imino-isoindolenine and 30 parts of m-anisidine are heated with stirring at 150° C. until after 30 to 50 minutes splitting off of ammonia is practically complete.

The cold, deep yellow melt is diluted with methanol and the deep yellow chloride of m-methoxyanilino-m-methoxy-phenyl-imino-isoindolenine is precipitated by means of hydrochloric acid.

*Example 47*

5 parts of amino-imino-isoindolenine are gently heated with excess cyclohexoxypropylamine (c-$C_6H_{11}OC_3H_6NH_2$) with stirring. At 70–80° C. ammonia readily escapes. Thereupon the mixture is dissolved in water and weakly acidified with nitric acid. Crystallization of cyclohexoxy-propylamino - cyclohexoxy - propylimino - isoindolenine-nitrate is completed by adding a solution of ammonium nitrate. On heating in glycol with copper acetate the product gives an easily soluble, brightly orange colored copper complex.

*Example 48*

20 parts of technical amino-imino-isoindolenine-nitrate are suspended in 100 parts of methanol at room temperature and 24 parts of monoethanolamine are rapidly added, the starting product being immediately dissolved thereby. Impurities in the solution are sucked off as fast as possible and the filtrate is stirred for some time. Oxethylamino-oxethylimino-isoindolenine obtained in a quantitative yield is colorless and melts at 196° C.

In form of the free base the product is insoluble in most customary solvents when cold.

The reaction may also be accomplished in aqueous solution.

*Example 49*

20 parts of amino-imino-isoindolenine are reacted with 40 parts of p-nitraniline in boiling glacial acetic acid.

After the starting product has initially been dissolved 1.4′ - nitrophenylamino - 3.4″ - nitrophenyl - imino - isoindolenine precipitates in light yellow small needles melting at 311–312° C.

The product yields a sodium salt crystallizing from aqueous methanol in long, deep red needles which is hydrolized again with much water.

*Example 50*

22 parts of 1-anilino-3-imino-isoindolenine (melting point 207° C.) are introduced into 69 parts of boiling tetraline. The solution is rapidly orange colored with the evolution of ammonia.

Boiling is stopped after 3–4 minutes, the solution is cooled to about 100° C. and sucked off. The residue consists of a small quantity (about 0.8 part) of finely crystallized, metal-free phthalocyanine.

On diluting the brown orange colored filtrate with one and a half times the quantity of methanol weakly orange colored needles precipitate. After cooling the precipitate is sucked off, washed with methanol and dried. The yield amounts to 6.5 parts. On boiling for a longer time the yield of the orange red product is reduced. The product is readily soluble in hot benzene and crystallizes by adding methanol in felted, brownish red needles melting at 187° C. According to analysis (C=79.15, H=4.6, N=15.75%) the reaction product is a condensation product consisting of 2 mols of 1-anilino-3-imino-isoindolenine having split off one mol of $NH_3$ or of 3 mols of amino-phenyl-imino-phthalimide having split off 2 mols of $NH_3$.

The orange red colored product melting at 187° C. is slightly soluble in methanol, however, immediately dissolves with deep orange yellow coloration by adding sodium hydroxide solution. By adding some water and hydrosulfite to the mixture an initially green, thereafter blue, vat-like solution is obtained which is decolorized on heating.

*Example 51*

24 parts of 1-oxethyl-amino-3-oxethyl-imino-isoindolenine (prepared according to Example 48) are stirred with 100 parts of acetic anhydride, the temperature being allowed to raise to 50° C. After one hour the excess anhydride is decomposed by adding ice; common salt solution is added to the clear solution in equal volume and the precipitated 1-acetoxethyl-amino-3-acetoxethyl-imino-isoindolenine-hydrochloride is isolated by conventional methods. The reaction product is obtained as colorless, readily soluble salt.

*Example 52*

13 parts of amino-imino-isoindolenine and 30 parts of anesthesin are dissolved in 200 parts of anhydrous ethanol and the temperature is raised to 130° C. while distilling the alcohol. The reaction is completed within a short time. After stirring with cold alcohol, sucking off and drying 19 parts of analytically pure, light-yellow 1-(p-carbethoxy-phenyl)-amino-3-imino - isoindolenine melting at 198—200° C. are obtained.

*Example 53*

The following substances are successively reacted in 100 parts of anhydrous ethanol at the said temperatures: 0.5 part of sodium at 20–50° C., 26 parts of phthalonitrile at 40–50° C., 40 parts of sulfanilic acid amide at 80° C.

The mixture is gradually cooled with stirring and the crystallized 1(p-sulfonylamido-phenyl)amino-3-imino-isoindolenine is isolated in known manner. 50–51 parts of a light-yellow product melting at 212° C. are obtained.

*Example 54*

80 parts of phthalonitrile and 97 parts of 3-chloro aniline are reacted in a methylate solution consisting of 2 parts of sodium and 50 parts of methanol at temperatures between 30 and 45° C. Already after 30 minutes the reaction product begins to crystallize from the clear solution. After 10–20 hours isolation is accomplished in the usual manner. 115–120 parts of pure, light-yellow 1-(3′-chlorophenyl)-amino-3-imino-isoindolenine melting at 214° C. are obtained.

Example 55

2 parts of sodium are dissolved in 150 parts of anhydrous methanol and in this solution 80 parts of phthalonitrile and 100 parts of 4-chloro aniline are caused to react. 105–110 parts of light-yellow 1-(4'-chlorophenyl)-amino-3-imino-isoindolenine melting at 206° C. are obtained.

Example 56

78 parts of 1-(3'-chlorophenyl)-amino-3-imino-isoindolenine (prepared according to Example 54) and 38 parts of 3-chloro aniline are heated in 100 parts of xylene at 150° C. for 7 hours, filtered at 100° C. and stirred when cold; the yellow crystallizate is sucked off when ice-cold, washed with benzine and dried. 91 parts of 1-(3'-chlorophenyl)amino - 3 - (3" - chlorophenyl)imino - isoindolenine melting at 150° C. are obtained.

Example 57

78 parts of 1 - (4'-chlorophenyl)-amino-3-imino-isoindolenine (prepared according to Example 55), 39 parts of 4-chloro aniline and 100 parts of xylene are heated under reflux to the boil for 5–7 hours, all reactants being dissolved thereby. 96 parts of 1-(4'-chlorophenyl)-amino-3-(4"-chlorophenyl)-imino-isoindolenine melting at 150° C. are obtained.

Example 58

2 parts of sodium, 80 parts of 4-anisidine, 80 parts of phthalonitrile are successively dissolved in 100 parts of anhydrous methanol, the temperature being allowed to raise up to 40–50° C. After 24 hours the crystallized product is sucked off when ice-cold, washed and dried. 128 parts of 1-(4'-methoxy-phenyl)-amino-3-imino-isoindolenine melting at 190–195° C. are obtained.

Example 59

81 parts of 1-(4'-methoxyphenyl)-amino-3-imino-isoindolenine (prepared according to Example 58), 41 parts of 4-anisidine in 100 parts of xylene are heated to the boil for 6–8 hours and then cooled with stirring. 85–90 parts of 1 - (4' - methoxyphenyl)-amino-3-(4"-methoxyphenyl)-imino-isoindolenine are obtained. The yellow product melts at 150–155° C.

Example 60

3 parts by weight of sodium are dissolved in 1000 parts by volume of methanol while stirring at room temperature. 160 parts of 2.3-dicyanopyrazine are introduced and a weak stream of gaseous ammonia is passed through the solution at 20–30° C. The solution becomes reddish at the beginning, later on yellow and, after some hours, a grey crystalline precipitate consisting of 4.7-diaza-1-amino-3-imino-isoindolenine forms to an increasing extent. After about 24 hours, the reaction product is filtered off, washed with methanol and acetone and dried. The yield amounts to 160 parts by weight.

Example 61

2 parts of sodium are dissolved in 700 parts by volume of methanol while stirring at room temperature. 70 parts of 3.4-dicyano-pyridine are introduced and a weak stream of gaseous ammonia is passed through the solution at 20–30° C. The solution becomes yellow at the beginning and, after about ½ hour, a grey crystalline precipitate consisting of 6-(or 5-)aza-1-amino-3-imino-isoindolenine forms to an increasing extent, which is suction filtered after about 24 hours, washed with acetone and ether and dried. The yield amounts to 65 parts.

Example 62

19.2 parts of 4-ethoxy phthalic anhydride (M. P. 119–120°) are introduced at 80° C. with stirring into a homogeneous melt of 32.4 parts of urea and 19.2 parts of ammonium nitrate with the addition of 0.03 part of ammonium molybdate. By heating the melt foams between 120 and 140° C., a brown-yellow, almost clear melt forms at 174–176° C. After about 2 hours' stirring a light crystalline precipitate forms almost instantaneously and the mixture becomes viscous. The mixture is diluted by quickly running in 100 parts of ice-cold water, stirred until a homogeneous paste has formed, filtered off, washed with water and dried. 22.6 parts of almost colorless nitrate of 1-amino-3-imino-5-(or 6-)-ethyoxy-isoindolenine, which corresponds to 89 per cent of theory are obtained. The product decomposes at about 247° C. It yields the free base with aqueous caustic soda solution. The base decomposes at about 175° C. with the formation of a green melt.

In analogous manner the nitrate of 1-amino-3-imino-5-(or 6-)methoxy-isoindolenine is obtained from 4-methoxy-phthalimide (M. P. of the pure product 216° C. uncorrected) or 4-methoxy-phthalic anhydride (M. P. 98–99° C.). The reaction product shows a decomposition point of 242–245° C. and dissolves in water somewhat more easily than the analogous product containing no methoxy group.

Example 63

8 parts of 4-methylmercapto phthalimide (M. P. 212–213° C.) are introduced into a mixture of 12 parts of urea 8 parts of ammonium nitrate 9 parts of nitrobenzene 0.1 part of ammonium molybdate at 130° C. and the mixture is gradually heated to 170–175° C. The solution which is clear at the beginning becomes yellow-brown on heating and fine, orange-yellow colored crystals precipitate after heating for about 3 hours. The reaction mass becomes soon very viscous; therefore it is expedient to dilute the mixture with 20 parts of nitrobenzene. After a reaction time of 3 hours the mixture is diluted with methanol after cooling to 80° C. and suction filtered in the hot state. The reaction product is washed with methanol and water and thereafter dried. The nitrate obtained in good yield crystallizes in long lemon-yellow needles which melt at 236° C.

By reacting the nitrate with the calculated amount of caustic soda solution in a suspension of methanol and water 1-amino-3-imino-5-(or 6-)methylmercapto-isoindolenine melting at 207–208° C. is obtained. The crystallized, weakly yellowish base dissolves in dilute acetic acid with an intensive orange-yellow coloration.

Example 64

A moderate stream of ammonia is passed over a suspension of 53.5 parts of phthalonitrile in 64 parts of a solution of ammonia in methanol containing about 12.5 parts of ammonia and 0.65 part of 19.25 per cent of a solution of caustic soda in methanol. The suspension is gradually heated to 60° C. and stirred at this temperature for about 1½ hours. The phthalonitrile dissolves after about 1¼ hours, and 1-amino-3-imino-isoindolenine (or its methanol addition compound) precipitates in coarse heavy crystals.

A small sample of the reaction mixtures in a mixture of pyridine and water gives a blue leuco compound with dilute caustic soda solution and sodium hyposulfite.

After about 1½ hours this leuco compound of a sample has disappeared alost completely; 0.20 part of glacial acetic acid is then added and stirring is continued at 60° C. for about ½ hour while passing over ammonia until no blue leuco compound is any longer visible.

When carrying out the reaction on a large scale production it is not necessary to precipitate the 1-amino-3-imino-isoindolenine in pure form. In this case it is sufficient to evaporate the reaction mixture to dryness in vacuo. About 62.1 parts of an almost colorless to faintly greenish product containing about 90.6 per cent of pure product, which corresponds to a yield of about 93 per cent of theory, are thus obtained.

Example 65

20.4 parts of 3.4-dicyano-diphenyl and 24.4 parts of a 10.5 per cent of solution of ammonia in methanol are introduced into the solution of 0.45 part of caustic soda in 48 parts of methanol and the mixture is stirred at 40–50° C. The dinitrile dissolves during 4–6 hours. The solution is neutralized with 0.68 part of glacial acetic acid and concentrated to a small volume. The resulting 1-amino-3-imino-5-(or 6-)phenyl-isoindolenine can be isolated by stirring the concentrated methanol solution with about 80 parts of toluene and subsequently evaporating the solvent in vacuo. The product is obtained as loose powder in a yield of over 90 per cent.

*Example 66*

250 parts of ground phthalonitrile are mixed while stirring with 500 parts by volume of liquid ammonia in an autoclave at 140° C. under a pressure of 105–110 atm. for 5–7 hours. After cooling the ammonia is blown off and the light-grey, partially coarsely crystalline residue is mechanically removed and the mixture is heated to 95° C. About 285 parts (corresponding to about 98 per cent of theory) of almost pure 1-amino-3-imino-isoindolenines are obtained. It is soluble in three times its quantity of water at 60° C. and crystallizes from its concentrated aqueous solution in long, colorless needles in form of a hydrate which can be dried at low temperature. The hydrate thus obtained can further be dried at 90–95° C. without the danger of saponification, the anhydrobase being thus obtained. The pure anhydrobase melts at about 194–196° C. with green coloration and evolution of ammonia. By prolonged heating the aqueous solution having a strongly bitter taste the product is saponified to form mono-imino-phthalimide and, finally, phthalimide with the evolution of ammonia.

Upon addition of nitrate-, phosphate-, sulfite- or perchlorateions the corresponding colorless, very difficulty soluble salts precipitate in crystals in an almost quantitative yield.

The anhydrobase and its hydrate easily dissolve in methanol already in the cold but are very slightly soluble in ether, acetone, benzene and cyclohexane, even in the heat. The base quickly dissolves in higher boiling solvents such as nitrobenzene and dichlorobenzene and even in pyridine with green coloration and evolution of ammonia and partial formation of metal free phthalocyanine. By mixing the 1-amino-3-imino-isoindolenine with glycol while stirring a crystallized addition product, which is more fully described in Example 17, is obtained. By heating the addition product with metallic salts, particularly in the presence of solvents, under suitable, weakly reducing conditions the corresponding metal phthalocyanines are obtained with the splitting off of amonia, mostly in a very good yield and even at water bath temperatures. By shaking the aqueous solution of the base with benzoyl chloride in the presence of alkali a dibenzoyl compound forms, which is obtained from benzene in form of light yellow, bright, coarse crystals in a pure form at 176–177° C.

| found | calculated for $C_{22}H_{15}O_2N_3$ |
|---|---|
| C=74.95% | C=74.77% |
| H= 4.20% | H= 4.28% |
| N=11.65% | N=11.89% |

*Example 67*

10 parts of 1-amino-3-imino-isoindolenine and 19 parts of N-amino-piperidine-hydrochloride are dissolved in 150 parts of methanol and left standing at room temperature until the intensity of the yellow coloration no longer increases. By introducing 500 parts of water with stirring, the reaction product precipitates in light yellow crystals. The yield amounts to 80 per cent of theory. The base, $C_{18}H_{25}N_5$ = 1-(1'-piperidyl-amino)-3-(1''-piperidyl-imino)-iso-indolenine is obtained analytically pure from pure starting materials. The base can be purified by re-crystallizing from gasoline or another organic solvent, or by dissolving in an alcohol and precipitating with water. The base dissolves in dilute acids but not in pure water.

*Example 68*

40 parts of technical 2-amino-naphthalene-5-sulfonic acid and 10 parts of 1-amino-3-imino-isoindolenine are dissolved in 160 parts of methanol. 50 parts of glacial acetic acid and the dark orange colored crystalline precipitate is suction filtered. The reaction product (34 parts) is apparently an internal salt of 1-(2''-naphthyl-5'-sulfonic acid)-amino-3-imino-isoindolenine. It is only very sparingly soluble in water and organic solvents. No medium suitable for recrystallization has been found so far.

*Example 69*

In 25 parts of methanol are dissolved 4 parts of 1-amino-3-imino-isoindolenine and 9 parts of a paraffin amine of the statistical molecular weight 194 which is obtained from the so-called first runnings of fatty acids via the ketones obtainable therefrom according to conventional methods. By stirring the solution at 20° C. for two hours, the amino group of the isoindolenine derivative is exchanged for the paraffin amine. The reaction product which crystallizes is filtered off at 0° C., washed with some cold methanol and dried. 3.2 parts of paraffin-amino-imino-isoindolenine is obtained which, according to analysis, has the statistical summation formula $C_{20.7}H_{32.2}N_3$.

The base can be recrystallized from light gasoline.

*Example 70*

20 parts of 1-paraffin-amino-3-imino-isoindolenine, 20 parts of ethanolamine, and 20 parts of glacial acetic acid are successively dissolved in 160 parts of methanol and the solution is stirred at room temperature. After 30 minutes 1 - hydroxyethyl - amino - 3 - hydroxyethyl - imino-isoindolenine begins to crystallize. Stirring is continued for another hour and the reaction product which is obtained in a quantitative yield is isolated by filtering, washing with water and drying.

*Example 71*

20 parts of 1-anilino-3-anilo-isoindolenine-hydro-chloride are suspended in 100 parts of methanol and 10 parts of ethanolamine are added. The solution which is dark yellow at the beginning gradually becomes lighter and 1 - hydroxyethyl - amino - 3 - hydroxyethyl - imino - iso-indolenine soon begins to crystallize in almost quantitative yield. The product is isolated as described in the preceding example.

*Example 72*

18 parts of hexamethylene diamine and 20 parts of phthalonitrile are reacted in the sodium methylate solution prepared from 0.5 part of sodium and 80 parts of methanol at 40–50° C. An amino-imino-isoindolenine derivative, $(C_8H_6N_3(CH_2)_6NH_2)$, which is substituted with one aminohexamethylene radical is formed. The reaction mixture is diluted with another 160 parts of methanol as soon as the reaction, which is exothermic at the start, is complete.

The solution is further stirred at room temperature for a prolonged period, at least 24 hours. The product slowly crystallizes in a yield of 34 parts which, according to analysis, represents $N^1.N^3$-cyclohexamethylene-1-amino-3-imino-isoindolenine formed by intramolecular amine exchange reaction to which two molecules of methanol are attached.

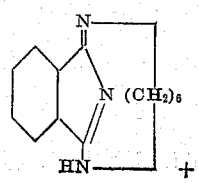 $+2CH_3OH$ F.210-218° C.

The product can be recrystallized from methanol (dissolution and crystallization proceeds very slowly); by boiling with acetic acid anhydride and pyridine the product yields the acetyl derivative $C_8H_4N_3(CH_2)_6OCOCH_3$ (M. P. 154° C.) which is liberated from methanol.

*Example 73*

15 parts of 1-amino-3-imino-isoindolenine, and 40 parts of 4-amino-azo-benzene are heated in 200 parts of xylene until no ammonia is any longer split off. When cooling the dark orange colored 1-benzene-azo-anilino-3-benzene-azo-anilo-isoindolenine crystallizes in good yield. The product is isolated by filtering and washing with cold methanol.

*Example 74*

13 parts of 1-amino-3-imino-isoindolenine and 20 parts of 2-amino-anthraquinone are rapidly heated with stirring in 100 parts of glycol and kept at 150–160° C. for some time. The reactants dissolve and ammonia is split off. After some minutes 24 parts of copper-red needles crystallize, which are isolated after cold stirring by filtering and washing with alcohol. The resulting 1-(2'-anthraquinonyl)-amino-3-(2''-anthraquinonyl)-imino-isoindolenine shows a melting point of about 270° C.

*Example 75*

24 parts of 3.4-dicyano-diphenyl are reacted with 20 parts of 4-amino-diphenyl in a solution of 0.5 part of sodium in 160 parts of methanol.

1 - (4'-phenol)-anilino-3-imino-5-(or 6-)phenyl-isoindolenine obtained in a quantity of 27.5 parts is heated to the boil in 13 parts of 4-amino-diphenyl in 200 parts of xylene whereby 50 parts of xylene are slowly filtered off. When cooling and/or diluting with a mixture of petroleum and ether the dark-yellow colored 1'-(4'-phenyl)-anilino-3-(4''-phenyl)-anilo-5-(or 6-)phenyl-isoindolenine crystallizes. The product is isolated by filtering and washing with petroleum and ether.

*Example 76*

20 parts of 1-amino-3-imino-4-(or 7-)azo-isoindolenine nitrate are dissolved in 50 parts of 2-amino-ethanol and 80 parts of methanol, filtered, diluted with another 40 parts of methanol and stirred at room temperature for 2 to 3 hours. 1-Hydroxyl-ethyl-amino-3-hydroxy-ethyl-imino-4-(or 7-)aza-isoindolenine crystallizes in good yield. The product dissolves in alcohol, water and mixtures of acetone and water and is almost insoluble in dry acetone.

On replacing ethanolamine by aniline the corresponding phenyl-substituted isoindolenine derivative is obtained in good yields. By replacing ethanolamine by piperidine the reaction yields the 1-piperidine-3-imino-4-(or 7-)aza-isoindolenine.

*Example 77*

8.8 parts of 1-thiomethyl-3-imino-isoindolenine (weakly cream-colored needles which melt at 102–103° C. with evolution of gas and formation of a blue melt) are boiled with reflux with 8 parts of ammonium nitrate in 80 parts of methanol. Already after some minutes a greenish-grey, slightly soluble product precipitates and methyl mercaptane escapes. The product (about 5 parts) which is isolated after one hour's heating under reflux, cooled to 40° C., suction filtered and washed with methanol, substantially represents the nitrate of 1-amino-3-imino-isoindolenine. By dissolving the product in cold dilute caustic soda solution, filtering off the non-dissolved, colored contaminations and precipitating the clear, almost colorless filtrate with glacial acetic acid with the addition of some ammonium nitrate, the nitrate of 1-amino-3-imino-isoindolenine is obtained in colorless, sandy-crystalline form (M. P.=293–294° C.). By replacing ammonia by aniline or ethanolamine the correspondingly substituted 1-amino-3-imino-isoindolenine derivatives are obtained in good yields.

1-thiomethyl-3-imino-isoindolenine is obtained by finely grinding 16.2 parts of imino-thio-phthalimide (prepared according to Example 41) with 320 parts of water, heating the suspension formed to 60° C. and mixing with 25 parts by volume of caustic soda solution (40 per cent). The solution thus obtained is quickly filtered and quickly cooled to 20° C. by addition of ice. By stirring the resulting clear, brown-yellow solution with 15 parts of dimethyl sulfate at room temperature weakly yellowish colored crystals precipitate after a short time. The precipitate is filtered off, washed with cold water and dried in the exsiccator. The yield amounts to 12 parts. The crude 1-thio-methyl-3-imino-isoindolenine is unstable on exposure to higher temperatures and light. It melts at about 90° C. with evolution of gas and formation of a dark green-blue colored melt. By dissolving the melt in methanol at a max. temperature of 40° C. and slowly diluting with water the product is obtained in cream-colored needles of the melting point 102–103° C. after green coloration from 85° C. By heating the thio-methyl ether in nitro-benzene and even in glacial acetic acid metalfree phthalocyanine is obtained.

*Example 78*

A weak current of ammonia is passed over a suspension of 0.28 part of methanolic caustic soda solution (19.25%), 19.8 parts of methanolic ammonia (corresponding to 3.75 parts of ammonia) and 7.19 parts of 4-ethoxy-phthalonitrile (prepared by splitting off water from 4-ethoxy-phthalamide, M. P. 133–134° C.) until the 4-ethoxy-phthalonitrile has dissolved and 4-ethoxy-phthalonitrile is no longer precipitated from a sample of the suspension on diluting with water and some drops of caustic soda solution. Thereupon 0.08 part of glacial acetic acid is added and ammonia is passed over the solution for another ½ hour. By evaporating the solution 5-(or 6-)ethoxy-1-amino-3-imino-isoindolenine is obtained as light crystalline powder which contains only small quantities of sodium acetate and can be employed immediately for further reaction. The crude product becomes greenish at 166–174° C. and decomposes at 176–177° C. with foaming. It is easily soluble in methanol and dilute acetic acid and difficultly in acetone. The yellow solution in hydrochloric acid is quickly decolorized by hydrolysis of 5-(or 6-)ethoxy-1-amino-3-imino-isoindolenine. The slightly soluble nitrate of the base can be precipitated by mixing the methanolic aqueous solution with ammonium nitrate solution and weakly acidifying with acetic acid. The nitrate which can advantageously be utilized for producing the pure base is weakly lemon-yellow colored. It becomes darker at 240° C. and decomposes at 244–245° C. with foaming.

By decomposing the nitrate suspended in methyl alcohol with the calculated amount of caustic soda solution and diluting the resulting solution with water, the pure base is obtained in small, coarse crystals which decompose at 179–180° C. By replacing ammonia by primary or secondary amines the correspondingly substituted isoindolenine derivatives are obtained.

*Example 79*

When replacing in the preceding example 4-ethoxy-phthalonitrile by the equivalent amount of 4-phenoxy-phthalonitrile (prepared by splitting off water from 4-phenoxy phthalamide, M. P. 101–102° C.) a solution of 5-(or 6-)phenoxy-1-amino-3-imino-isoindolenine is obtained. By evaporating the solution the base remains behind as a brittle, yellow colored mass which can easily be pulverized. The mass is easily soluble in methanol, difficultly soluble in acetone and shows properties similar to the ethoxy compound described in the preceding example. The slightly soluble nitrate of the base, which is strongly lemon-yellow colored, becomes dark at temperatures above 250° C. and decomposes at 264–265° C. with foaming. The base prepared from the nitrate melts at 94–96° C. to form a dark green liquid which decomposes at 101–102° C. with foaming.

The syntheses described in the foregoing paragraphs

B, C and D are equivalent to each other, i. e. it is possible to produce any 1-amino-3-imino-isoindolenine derivative directly from dinitrile by addition of an amine as well as by exchange of the alkoxy or amino group in the corresponding 1-alkoxy- or 1-amino-3-imino-isoindolenine derivatives for the same amine. In the foregoing examples the processes according to paragraphs B, C and D are interchangeable as will be apparent to anyone skilled in the art. Therefore it is unnecessary to specifically describe each of these processes for each and every isoindolenine derivative hereinbefore described, the disclosure of one process constituting also a full disclosure of the other possible methods. Furthermore each 1-amino-3-imino-isoindolenine derivative obtainable by the method of production according to paragraph A may also be obtained by the processes described in paragraphs B, C and D.

We claim:

1. The process for the production of 1-amino-3-imino-isoindolenine derivatives which comprises reacting at temperatures up to about 160° C. a compound of the general formula

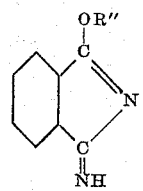

wherein Z stands for the atoms necessary to complete the benzene nucleus and R' stands for a radical selected from the group consisting of -SH, -Salkyl and -Oalkyl, the alkyl chain of which having at most 5 carbon atoms, $n$ stands for an integer from 1 to 6, with a compound of the formula

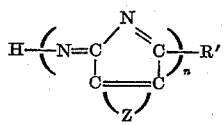

wherein $R_1$ and $R_2$ stand for radicals selected from the group consisting of hydrogen, lower alkyl, cycloalkyl, aralkyl having no more than 10 carbon atoms and aryl having no more than 10 carbon atoms, and $R_1+R_2$ stand for a radical selected from the group consisting of the divalent radicals $-(CH_2)_5-$ and $-(CH_2)_2O(CH_2)_2-$ both free valences being attached to the nitrogen atom.

2. A process as claimed in claim 1 which comprises carrying out the reaction in an inert organic solvent.

3. The process for the producing of 1-amino-3-imino-isoindolenine derivatives which comprises reacting in an inert inorganic solvent at temperatures up to about 160° C. a compound of the general formula

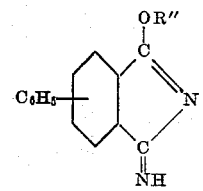

wherein Z stands for the atoms necessary to complete the benzene nucleus and R" stands for an alkyl radical containing at most 5 carbon atoms, with a compound of the formula

wherein $R_1$ and $R_2$ stand for radicals selected from the group consisting of hydrogen, lower alkyl, cycloalkyl, aralkyl having no more than 10 carbon atoms and aryl having no more than 10 carbon atoms, and $R_1+R_2$ stand for a radical selected from the group consisting of the divalent radicals $-(CH_2)_5-$ and $-(CH_2)_2O(CH_2)_2-$ both free valences being attached to the nitrogen atom.

4. The process for the production of 1-amino-3-imino-isoindolenine which comprises reacting in an inert organic solvent at temperatures up to about 160° C. a compound of the general formula

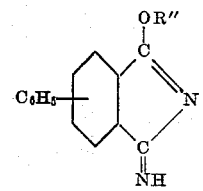

wherein R" stands for an alkyl radical containing at most 5 carbon atoms, with ammonia.

5. The process for the production of 1-amino-3-imino-isoindolenine derivatives which comprises reacting in an inert organic solvent at temperatures up to about 160° C. a compound of the general formula

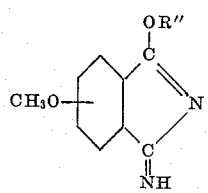

wherein R" stands for an alkyl radical containing at most 5 carbon atoms, with ammonia.

6. The process for the production of 1-amino-3-imino-isoindolenine derivatives which comprises reacting in an inert organic solvent at temperatures up to about 160° C. a compound of the general formula

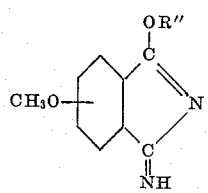

wherein R" stands for an alkyl radical containing at most 5 carbon atoms, with ammonia.

7. As new compounds 1-amino-3-imino derivatives of the general formula

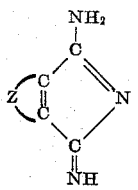

wherein Z stands for the atoms necessary to complete a substituted benzene nucleus the substituent in said benzene nucleus being a member of the group consisting of alkyl, alkoxy, aryloxy, phenyl, hydrocarbon mercapto, heterocyclyl, halogen, -NH acyl, $-NO_2$, -COOH, $SO_3H$, $-SO_2NH_2$, $-SO_2NH$ alkyl, $-SO_2N(alkyl)_2$, and a condensed carbocyclic nucleus.

8. As new compounds

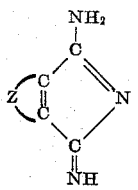

9. As new compounds 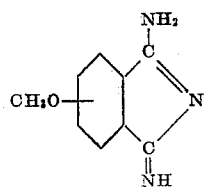
10. As new compounds 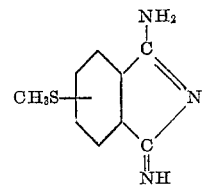
References Cited in the file of this patent
Franklin: Nitrogen System of Compounds, p. 267, Reinhold Pub. Corp., N. Y. (1935).